United States Patent [19]

Mezger

[11] 3,814,250

[45] June 4, 1974

[54] POWER TRANSMISSION
[75] Inventor: Robert H. Mezger, Livonia, Mich.
[73] Assignee: Sperry Rand Corporation, Troy, Mich.
[22] Filed: Sept. 29, 1972
[21] Appl. No.: 293,628

[52] U.S. Cl. ................. 210/90, 210/130, 137/556
[51] Int. Cl. .......................................... B01d 27/10
[58] Field of Search ............. 210/90, 91, 130, 352; 137/549, 556, 557

[56] References Cited
UNITED STATES PATENTS
3,165,467  1/1965  Klein et al. ..................... 210/130
3,186,549  6/1965  Botstiber .......................... 210/86
3,545,616  12/1970  Aspinwall ........................ 210/90

Primary Examiner—Samih N. Zaharna
Assistant Examiner—B. Castel
Attorney, Agent, or Firm—Theodore Van Meter

[57] ABSTRACT

A filter includes a cylindrical filter element which is arranged to normally have fluid pass therethrough. A linear bypass valve opens in response to a predetermined pressure drop through the filter element and operates an indicator when the valve is open. A spring within the filter element and supported thereby holds the valve closed at other times. A second spring opens the valve when the filter element or the spring or both are omitted, thus causing the indicator to be shifted in the same manner as when the pressure drop across the element is too high.

1 Claim, 2 Drawing Figures

PATENTED JUN 4 1974

3,814,250

POWER TRANSMISSION

Many devices handling the liquids at high pressure and which have close fitting precision manufactured parts depend upon reliable filtration to prevent wear caused by contaminants. It is customary to provide for this requirement by the provision of filtering devices which utilize a cartridge element which may be replaced when it becomes clogged. It is also common to provide a bypass valve which permits flow around a clogged element and this bypass valve may actuate an indicator to show when it is open. Such a device is illustrated in the U.S. Pat. No. to Aspinwall and Graham 3,545,616, Dec. 8, 1970. It sometimes occurs that willfully or through negligent maintenance, the protection afforded by such devices may be frustrated with no indication that such a condition exists which, of course, leads to rapid deterioration of the expensive machinery which the filter is designed to protect. Such a condition can arise, for example, when the filter is assembled with the element missing or with the bypass valve spring omitted or with both conditions simultaneously.

The present invention aims to overcome these difficulties by assuring that the bypass valve will open and the indicator will shift to its warning position whenever the filter is operated without either a cartridge element or spring present within it.

This is achieved by the provision of a filter which comprises a housing member and a cover member, spaced inlet and outlet connections, a cylindrical filter cartridge interposed between the connections, a combined bypass valve and indicator mounted in one member and adjacent an end of the cartridge, a first spring in the cartridge biasing the valve to closed position, a second spring biasing the valve to open position, the first spring having an end supported by the cartridge whereby if either the cartridge or the spring or both are removed, the valve and the indicator will be shifted by the second spring to open position.

IN THE DRAWING

Figure 1:
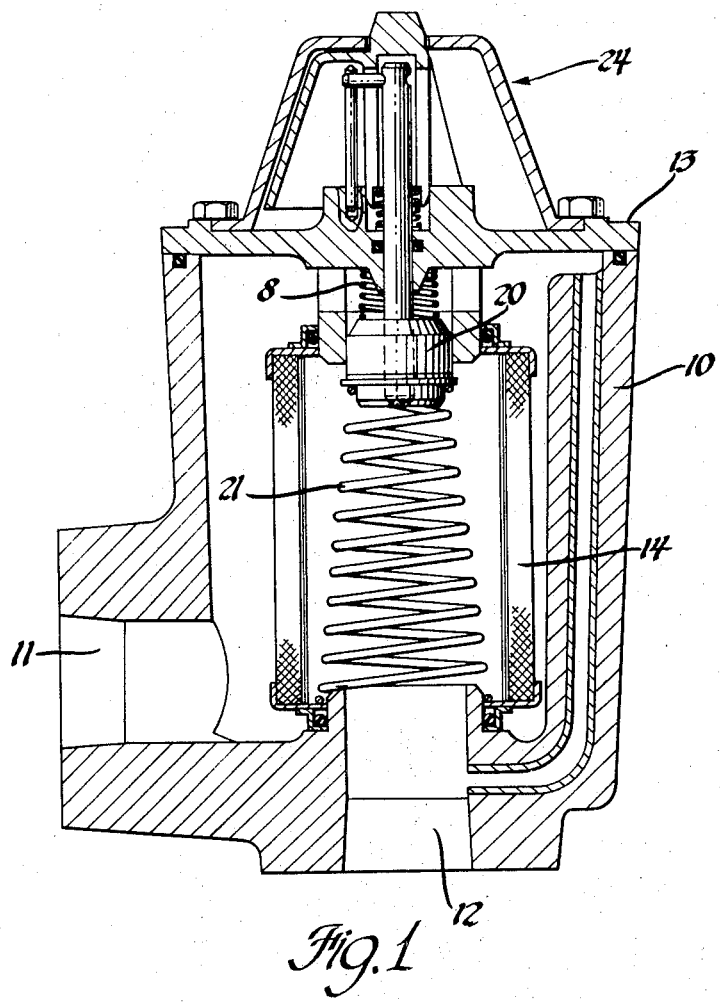
FIG. 1 is a cross section of a filter incorporating a preferred form of the present invention.

The disclosure of the foregoing patent to Aspinwall et al is referred to and incorporated as a part of the present disclosure. In the embodiment herein described, the same reference characters are used for the similar parts such as the housing 10, the inlet 11, outlet 12, the cover 13, cartridge element 14, bypass valve 20, helical spring 21 and the indicating means 24. These parts all function in the same manner as described in Aspinwall et al. In addition, the present invention provides a light spring 8 which urges the bypass valve 20 and the indicating means 24 to open position. The spring 21 also is somewhat stronger to compensate for the additional force imposed by the spring 8. It will be noted that the lower end of spring 21 rests on a shoulder near the bottom of the cartridge element 14.

Figure 2:
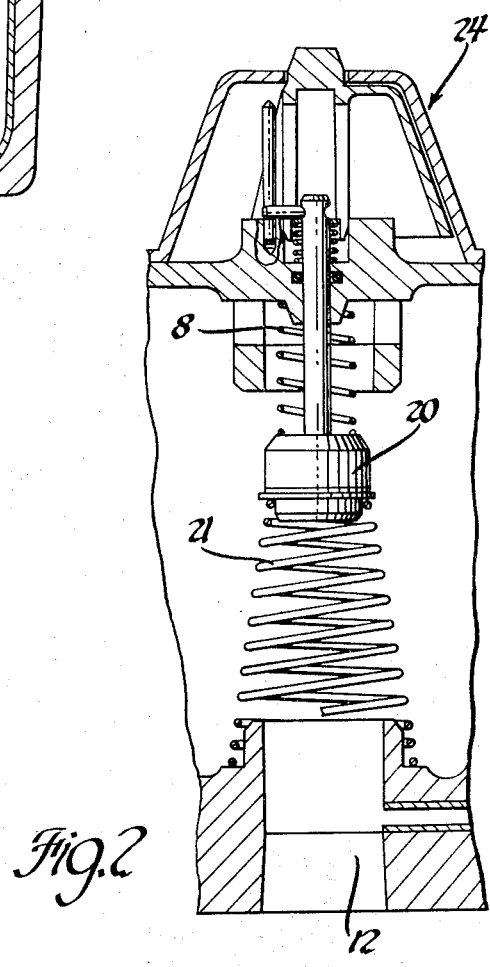
FIG. 2 is a fragmentary cross section corresponding to FIG. 1 showing the parts in a different position.

In the event that the housing 10 and cover 13 were to be assembled without either the spring 21 or the element 14 present or with both of them absent, this fact will be made evident by reason of the spring 8 having pushed the bypass valve 20 to open position, as shown in FIG. 2. This is readily permitted if, for example, only the element 14 is omitted by reason of the repositioning of the lower end of spring 21 which no longer has the shoulder at the bottom of element 14 on which to rest, but must shift downwardly to rest on the floor of the housing 10.

I claim:

1. A filter comprising a housing member and a cover member, spaced inlet and outlet connections, a cylindrical filter cartridge interposed between the connections, a combined bypass valve and indicator mounted in one member and adjacent an end of the cartridge, a first spring in the cartridge biasing the valve to closed position, a second spring biasing the valve to open position, the first spring having an end supported by the cartridge whereby if either the cartridge or the spring or both are removed, the valve and the indicator will be shifted by the second spring to open position.

* * * * *